United States Patent
Chiu et al.

(10) Patent No.: US 7,292,408 B2
(45) Date of Patent: Nov. 6, 2007

(54) BILAYER COIL INSULATION FOR MAGNETIC WRITE HEADS TO MINIMIZE POLE RECESSION

(75) Inventors: Andrew Chiu, San Jose, CA (US); Edward Hin Pong Lee, San Jose, CA (US); John Jaekoyun Yang, Newark, CA (US); Michael Ming Hsiang Yang, San Jose, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 370 days.

(21) Appl. No.: 10/903,341

(22) Filed: Jul. 30, 2004

(65) Prior Publication Data

US 2006/0023351 A1   Feb. 2, 2006

(51) Int. Cl.
G11B 5/17 (2006.01)
(52) U.S. Cl. .................................. 360/123
(58) Field of Classification Search ............ 360/317, 360/126, 123, 120; 29/603.12, 603.14, 603.15
See application file for complete search history.

(56) References Cited

U.S. PATENT DOCUMENTS

| | | | |
|---|---|---|---|
| 4,943,882 A | 7/1990 | Wada et al. | 360/126 |
| 5,325,254 A | 6/1994 | Cooperrider | 360/126 |
| 5,395,644 A | 3/1995 | Affinito | 427/124 |
| 5,652,687 A | 7/1997 | Chen et al. | 360/126 |
| 6,317,290 B1 * | 11/2001 | Wang et al. | 360/126 |
| 6,353,511 B1 | 3/2002 | Shi et al. | 360/126 |
| 6,377,423 B2 | 4/2002 | Dill, Jr. et al. | 360/126 |
| 6,400,526 B2 * | 6/2002 | Crue et al. | 360/126 |
| 6,504,676 B1 | 1/2003 | Hiner et al. | 360/126 |
| 6,515,825 B1 | 2/2003 | Sato | 360/126 |
| 6,557,242 B1 | 5/2003 | Santini | 29/603.14 |
| 6,597,534 B1 | 7/2003 | Sato | 360/126 |
| 6,693,769 B2 | 2/2004 | Hsu et al. | 360/126 |
| 6,785,953 B2 * | 9/2004 | Santini | 29/603.14 |
| 6,870,712 B2 * | 3/2005 | Chen et al. | 360/317 |
| 6,940,688 B2 * | 9/2005 | Jiang et al. | 360/123 |
| 7,002,776 B2 * | 2/2006 | Sasaki | 360/126 |
| 7,126,789 B2 * | 10/2006 | Han et al. | 360/126 |
| 2002/0060879 A1 | 5/2002 | Sato | 360/126 |
| 2002/0191350 A1 | 12/2002 | Santini | 360/317 |
| 2003/0076630 A1 | 4/2003 | Sato et al. | 360/126 |
| 2003/0202278 A1 | 10/2003 | Chen et al. | 360/126 |
| 2004/0027716 A1 | 2/2004 | Chen et al. | 360/126 |
| 2004/0042117 A1 | 3/2004 | Ikegawa | 360/126 |

FOREIGN PATENT DOCUMENTS

JP    5046929    2/1993

\* cited by examiner

*Primary Examiner*—Angel Castro
(74) *Attorney, Agent, or Firm*—Zilka-Kotab, PC

(57) ABSTRACT

A magnetic write head for use in a data recording system having first and second magnetic pole, the first pole having a P1 pedestal. An electrically conductive coil passes through a space between the first and second poles for inducing a magnetic flux through the yoke formed by the first and second poles. A bi-layer insulation layer disposed between the poles includes a layer of photoresist for preventing voids and a layer of alumina formed thereover to provide a structural brace to prevent recession of the P1 pedestal during manufacturing operations such as soda blast.

7 Claims, 12 Drawing Sheets

BILAYER COIL INSULATION FOR MAGNETIC WRITE HEADS TO MINIMIZE POLE RECESSION

FIELD OF THE INVENTION

The present invention relates to magnetic write heads, and more particularly to a magnetic write head having a bilayer insulation layer for preventing P1 pole pedestal recession.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In the face of the ever increasing demand for improved data rate and data capacity, researchers continually strive to decrease the size and increase the write performance of write elements. One recently constructed write head, termed a bionic head, has been manufactured by Hitachi Global Storage Technologies. The bionic head includes a first pole (P1) that includes a first layer of magnetic material, and a magnetic pedestal (P1 pedestal) formed on that first layer of magnetic material. A thin layer of dielectric material is formed over the top of the P1 pedestal, and the second pole extends over the first pole from the pole tip region to the back gap. The bionic head provides excellent track width control, bit size and magnetic field strength.

Write heads, such as the bionic head described above, have suffered from recession. Recession of the P1 pedestal is a term that refers to the P1 pedestal sinking into the write head (ie. away from the magnetic medium). As can be appreciated, this recession of the pedestal portion of the first pole increases the effective fly height of the write head. As slider fly heights decrease, the effect of this recession becomes a larger percentage of the fly height budget, seriously degrading write performance. To maintain performance standards, manufacturers must specify a maximum allowable level of recession. A head having recession greater than this amount must be scrapped. Currently yield losses due to recession have been as high as 0.5%.

Therefore, there is a strong felt need for a way of reducing recession in the construction of a write head such as a bionic head. Such a means for reducing recession would preferably involve existing manufacturing techniques and materials so as not require significant additional manufacturing expense. Such a method would also preferably not negatively affect other performance parameters such as track width control, write gap thickness, or field strength among others.

SUMMARY OF THE INVENTION

After the read and write heads have been manufactured, the air bearing surface of the slider must be formed. The air bearing surface of the slider is engineered with a desired topography that allows the slider to fly at a stable, low fly height. In fact, fly height is a critical performance parameter, in that lower fly heights provide better read and write sensor performance due to decreased spacing between the read/write head and the magnetic medium.

One of the manufacturing processes used to create the air bearing surface is a soda blast operation. The soda blast operation removes unwanted residual dry film resist left over from the manufacture of the read/write head. We have found that this soda blast operation is a major contributor to recession of the P1 pedestal. We have also found that this recession is not due to the removal of material from the P1 pedestal but is actually due to plastic deformation of the P1 pedestal caused by the force of the soda blast on the pedestal. The P1 pedestal is actually bent in the process.

The present invention, provides magnetic write head that exhibits exceptional recession resistance during soda blast. The write head includes a first magnetic pole P1 that includes a first magnetic layer and a P1 pedestal formed thereon in a pole tip region. An electrically conductive coil is formed over and insulated from the first layer of magnetic material of the P1 pole.

A layer of photoresist encases the coil and insulates the winds of the coil from one another. Another layer of photoresist, a fill layer, is deposited to fill in any void left between the encasing photoresist layer and the P1 pedestal. The photoresist layers are preferably constructed so that the upper surface of the photoresist is below the upper surface of the coil. A layer of alumina is deposited over the photoresist preferably having an upper surface that is coplanar with an upper surface of the P1 pedestal. Subsequent manufacturing processes may be familiar to those skilled in the art and may include depositing a non-magnetic write gap layer and forming a second pole.

The bilayer insulation of the present invention, therefore, includes a layer of photoresist, and layer of alumina formed there over. The photoresist has the ability to flow into and fill small spaces. Therefore, the presence of the photoresist underlayer can advantageously fill the spaces between the turns of the coil and can fill the space between the coil and the P1 pedestal without resulting in undesirable voids.

The presence of the alumina upper insulation layer advantageously prevents recession by providing a strong mechanical brace to the P1 pedestal. Alumina is several thousands of times stronger than photoresist. The alumina layer is deposited in such a way that it abuts a back end of the P1 pedestal, very strongly supporting the pedestal and effectively preventing deformation of the P1 pedestal during soda blast operations.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
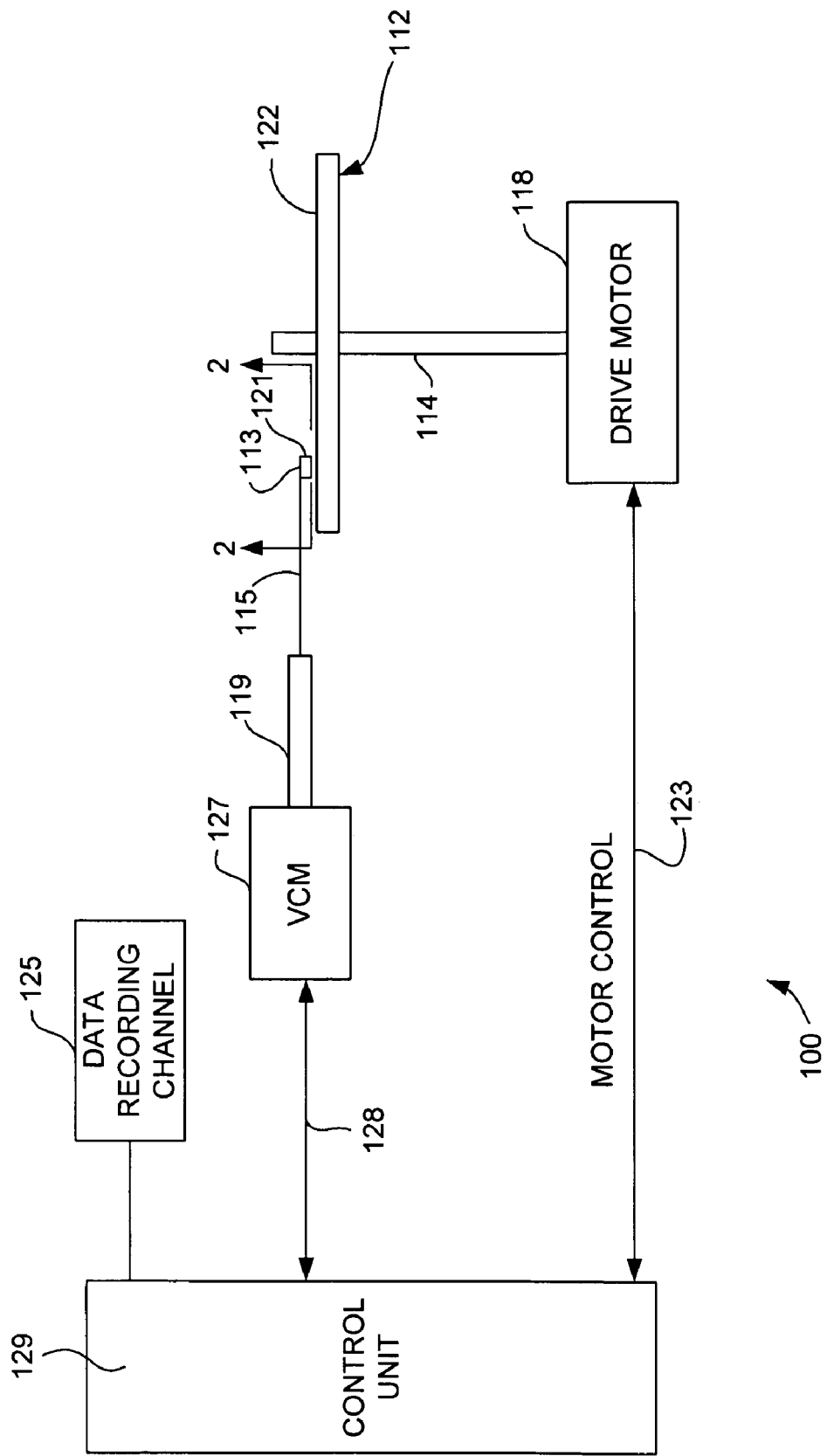
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
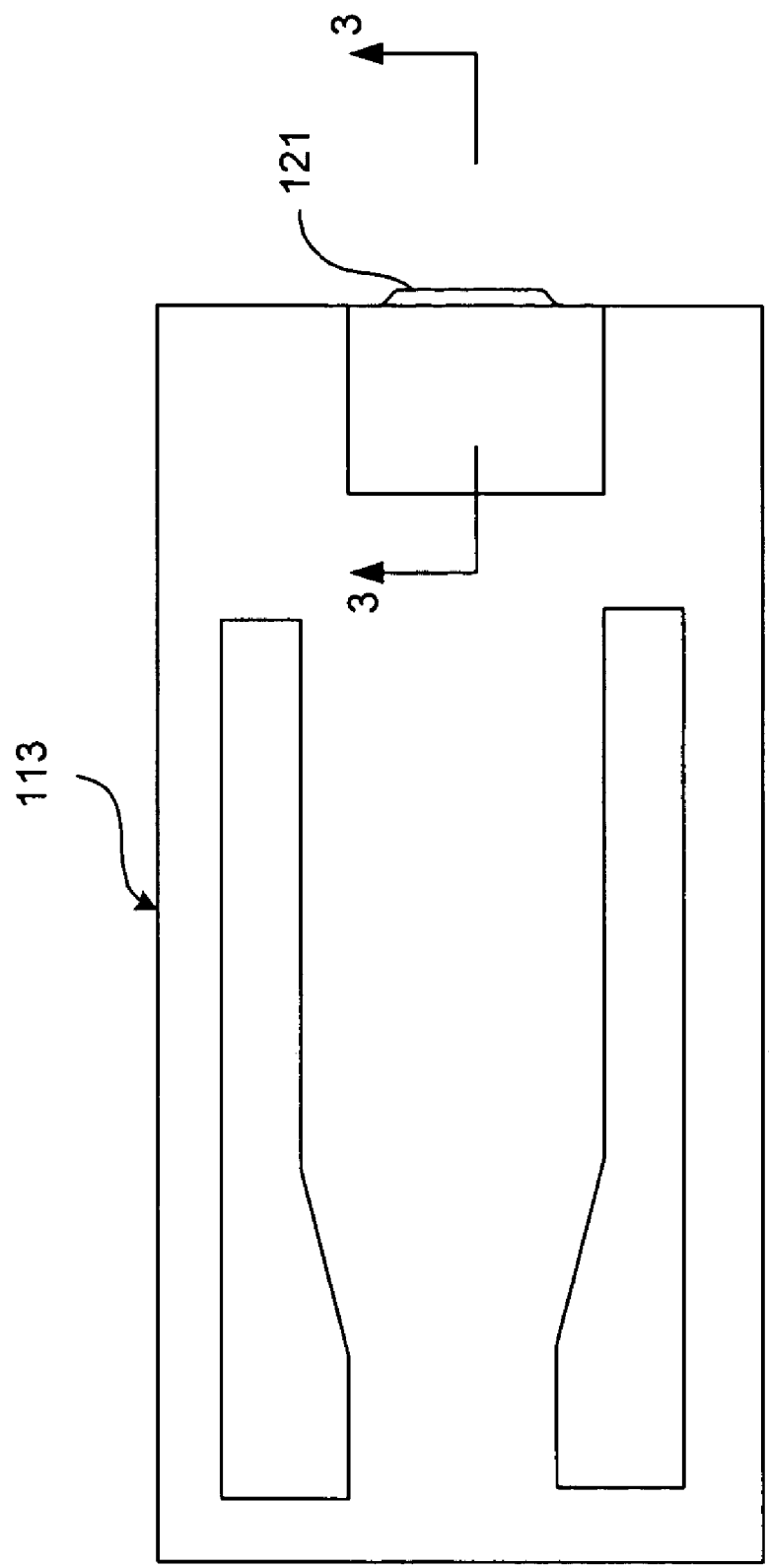
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
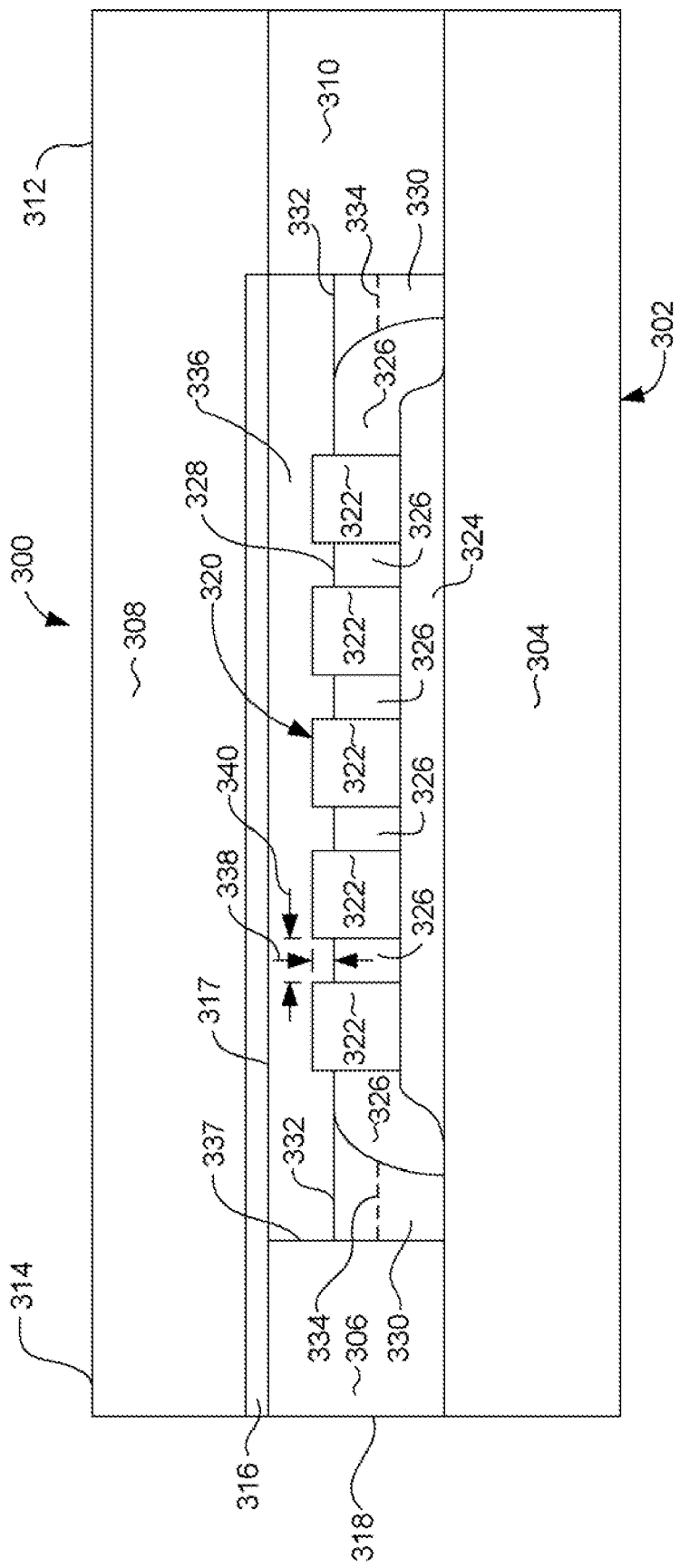
FIG. 3 is a cross-sectional view of an inductive write head, taken from line 3-3 of FIG. 2, according to an embodiment of the present invention.

With reference now to FIG. 3, a magnetic write head 300 according to an embodiment of the present invention includes a first pole 302 having a first magnetic layer 304 and a pedestal structure (P1 pedestal) 306. The write head also includes a second pole P2 308 formed over the first pole 302. The second P2 308 is magnetically connected to the first pole 302 by a magnetic back gap structure 310, disposed in a back gap region 312 that is opposite a pole tip region 314. The second pole 308 is separated from the P1 pedestal by a non-magnetic write gap layer 316. At the pole tip region 314, the write head 300 terminates at and end defining an air bearing surface (ABS) 318.

An electrically conductive coil 320 has a plurality of turns 322 that pass between the first and second poles 302, 308 in a region between the P1 pedestal 306 and the back gap structure 310. The coil 320 (shown in cross section in FIG. 3) can be constructed of many non-magnetic, electrically conductive materials and is preferably constructed of Cu. A thin dielectric layer 324 insulates the coil 320 from the first magnetic layer 304 of the first pole 302. A coil insulation layer 326 insulates the turns 322 of the coil 320 from one another as well as insulating the coils from other structures such as the P1 pedestal 306 and back gap 310. The insulation layer 326 is preferably constructed of hard baked photoresist and has an upper surface 328 that is below the upper surface of the coil 320. A photorsist fill layer 330 fills a space or cavity between the hard baked photoresist insulation layer 326 and the P1 pedestal 306. This same fill layer 330 may also fill the space between the hard baked photoresist layer 326 and the back gap 310. Photoresist has the advantageous property of being able to fill small cavities such as the space between the hard baked resist 326 and the P1 pedestal without forming voids. The fill layer 330 has an upper surface 332 that may be coplanar with the upper surface 328 of the hard baked resist layer 326. However, the uppers surface 332 of the fill layer 330 may also be at some level below the surface 328 of the hard baked resist 326, such as at the level shown by dashed line 334.

With continued reference to FIG. 3, a layer of $Al_2O_3$ (alumina) 336 is formed over the hard baked resist 326, fill layer 330 and coil 322. The alumina layer 336 abuts the back end 337 of the P1 pedestal 306 to provide strong support against recession of the P1 pedestal 306. The alumina layer 336 extends to the write gap layer 316 and has an upper surface 317 that is coplanar with an upper surface 320 of the P1 pedestal 306. As can be seen in FIG. 3, since the upper surface 332 of the hard baked resist layer 326 is below the upper surface of the coils 320, the alumina layer 336 extends down into the coil 320 being interspersed between the turns 322 of the coil 320.

While it would be desirable to have as much alumina 336 as possible behind the P1 pedestal to act as a brace against recession, the amount of alumina deposited is limited by the need to prevent the formation of voids within the alumina layer 336. When deposited into small spaces alumina tends to form voids. Such voids lead to corrosion and compromise structure integrity and are, therefore, unacceptable. If one were to attempt to completely fill the space between the coil turns 322 with alumina such unacceptable voids would inevitably result. Similarly, if one were to attempt to completely fill the space between the hard baked resist 326 and the P1 pedestal 306 with alumina, without first depositing the fill layer 330 voids would be formed.

Therefore, the photoresist fill 330 is preferably applied to such a height or thickness that filling the remainder of the space with alumina will not result in voids. This thickness will vary by specific write head configuration, but is generally such that the aspect ratio of a particular region is not greater than about ½. For example, as can be seen in FIG. 3, the alumina layer 336 extends down into the space between the turns 322 of the coil 320. The thickness or depth 338 of the alumina within the space between the turns 322 of the coil 320 should be no greater than ½ the width 340 of the space between the turns 322. Similarly, the portions of the alumina layer 336 disposed within the space formed between the coil 320 and the pedestal should extend down into that space by a depth that is no more than about ½ it's width in that space. Maintaining this maximum aspect ratio will assure that no voids will form within the alumina layer 336.

Figure 4:
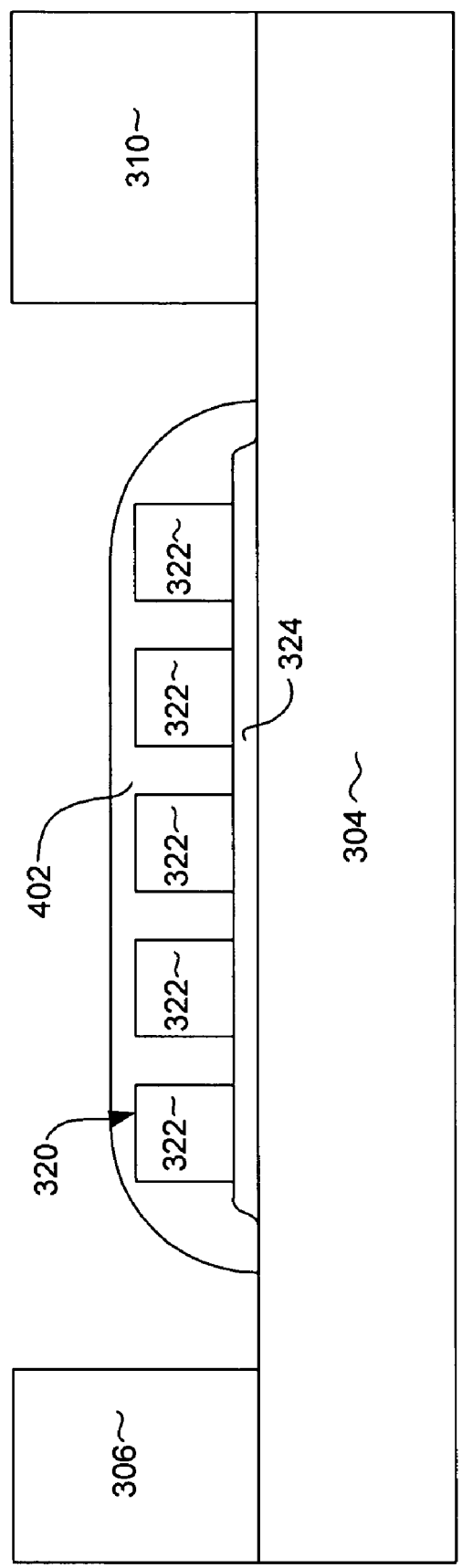
FIGS. 4-7 are cross-sectional views of the write head of FIG. 3, shown in various intermediate stages of manufacture.

FIGS. 4-7 illustrate a possible method for constructing a write head 300 according to the above described embodiment of the invention. With reference to FIG. 4, the first pole 302 is provided, including the first layer 304 and pedestal 306. The first layer 304 can be formed by electroplating and can be constructed of, for example NiFe. The pedestal 306 may also be formed by electroplating, and is preferably constructed of a high saturation magnetic material such as CoFe or $Ni_{50}Fe_{50}$. The back gap 310 is constructed on top of the first pole 302 and may also be constructed of electroplated NiFe.

With continued reference to FIG. 4, a thin layer of insulation 324 is formed over the pole in the area where the coil 320 will be formed. The insulation 324 can be, for example alumina and can be deposited by sputtering. The coil 320 is then formed. The construction of the coil 320 can be by lithographic processes that will be familiar to those skilled in the art, such as: sputter depositing an electrically conductive seed layer on the insulation 324; depositing and patterning a photoresist frame (not shown) having a trench in the desired coil pattern; electroplating the coil; removing the photoresist frame and performing ion mill to remove the seed between the coil turns 322. Other methods such as damascene methods may also be use to construct the coil. After the coil has been formed, a layer the photoresist 402 is deposited over the coil and is hard baked to form a hard, rounded insulation layer 402 (hard baked photoresist).

Figure 5:
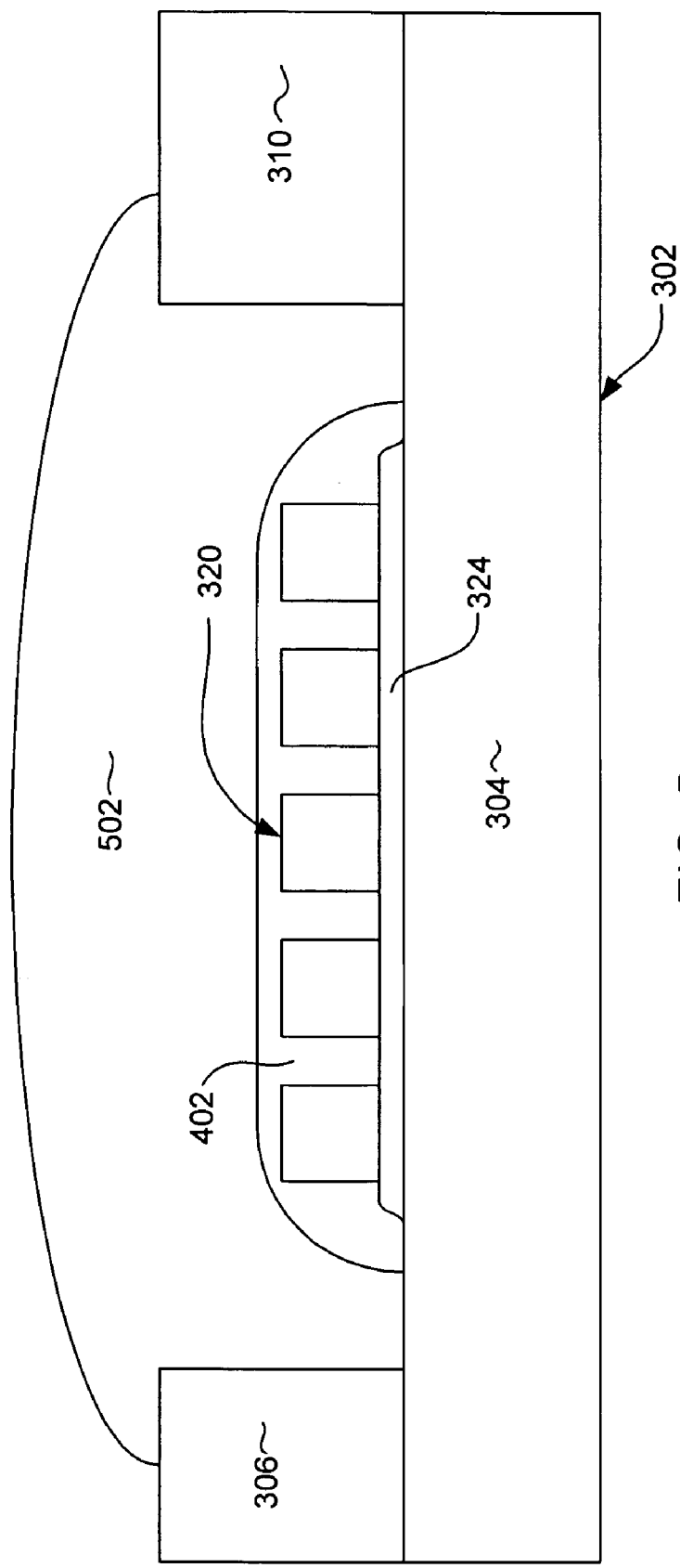

With reference now to FIG. 5, another layer of photoresist 502 (photoresist fill layer) is deposited, preferably extending from the pedestal 306 to the back gap 310. As mentioned above, since photoresist has the desirable ability to flow into small areas without forming voids, the first hard baked insulation layer 402, will be able to flow into the spaces between the coil turns 322 without forming voids. Similarly, the photoresist fill 502 will be able to flow into the space between the coil 320 and the pedestal 306 without forming voids. A chemical mechanical polishing process (CMP) (not shown) is then performed to planarize the surface of the fill layer 502 creating a planar surface on the fill layer 502 that is coplanar with the upper surface of the pedestal 306.

Figure 6:
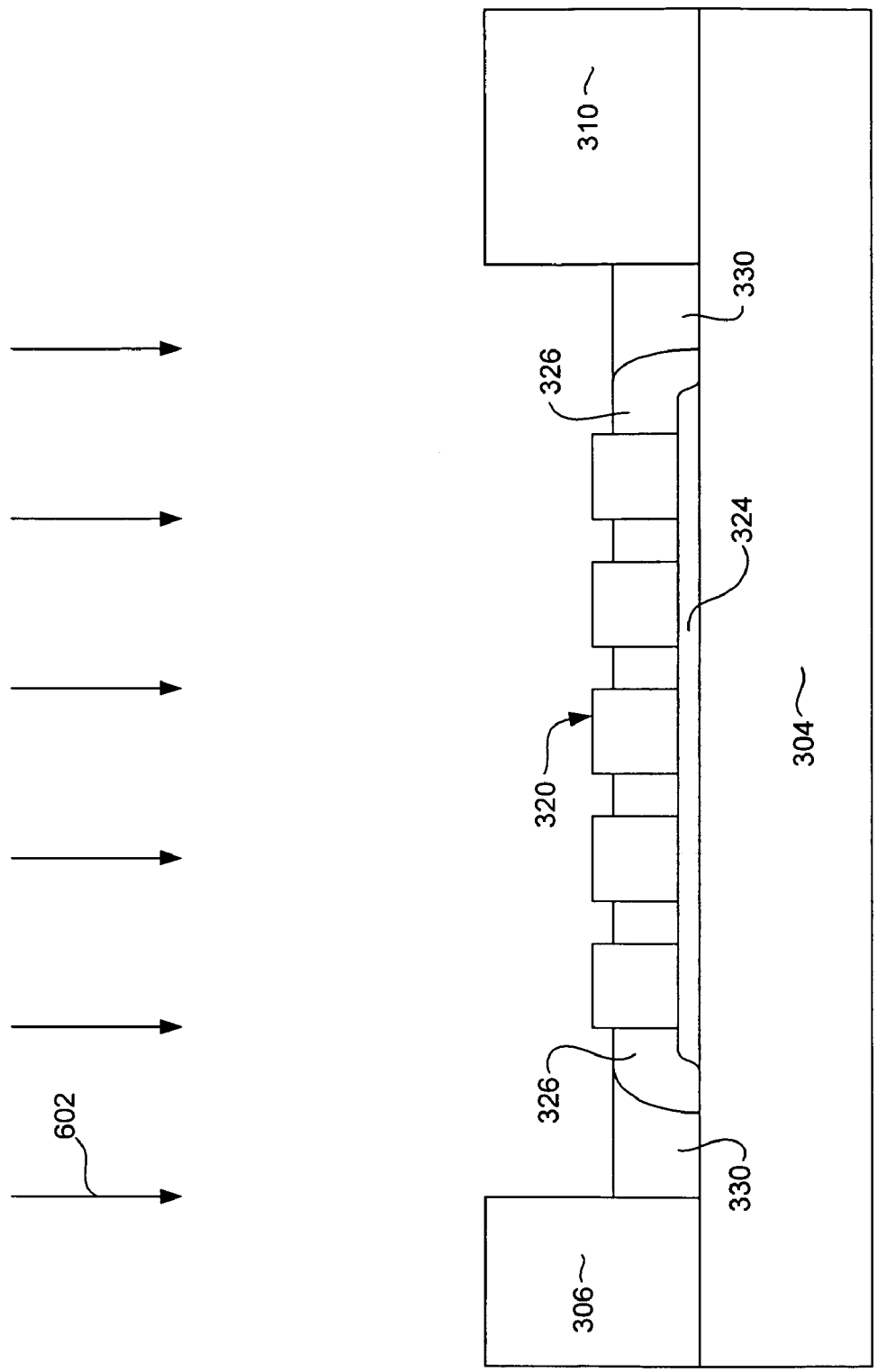
Figure 7:
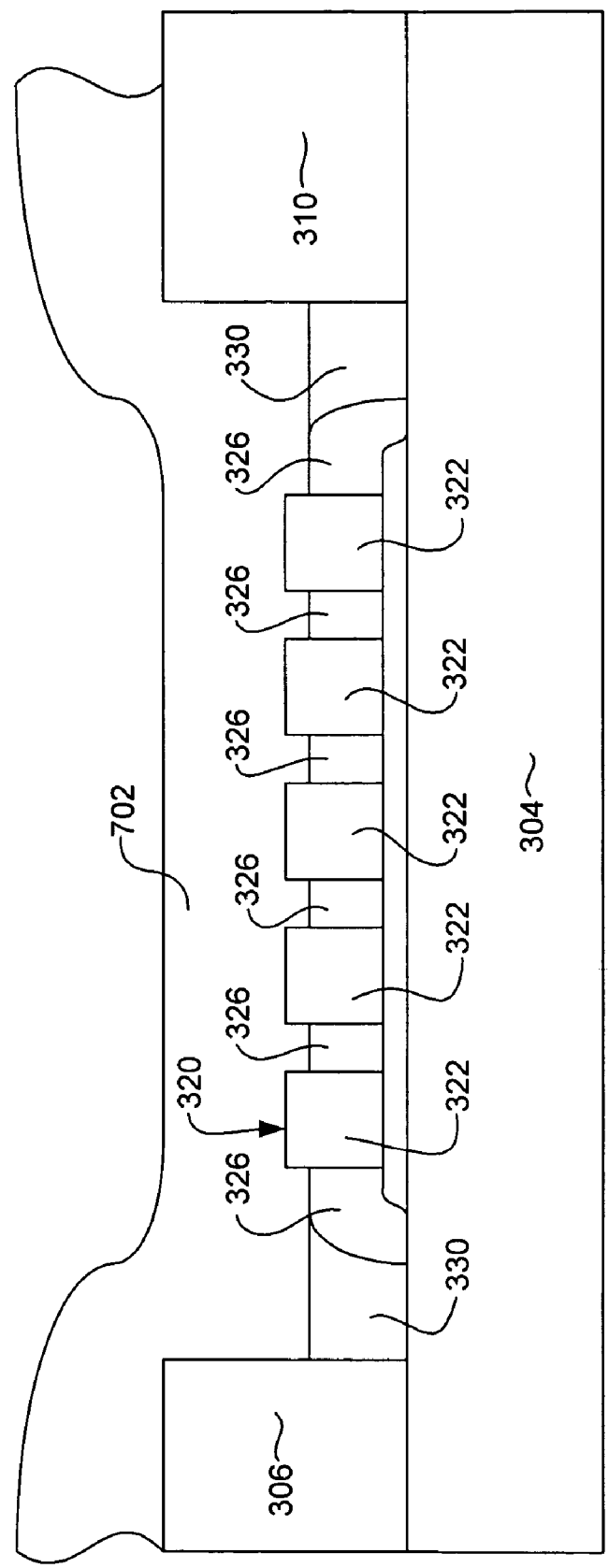

Thereafter, with reference to FIG. 6, a reactive ion etch (RIE) 602 is performed to remove a desired amount of the photoresist layers 402, 502 (FIG. 5), forming the hard baked photoresist layer 326 and the photoresist fill layer 330 previously discussed with reference to FIG. 3. The RIE process 602 is performed with a RIE chemistry that will readily remove photoresist, but will leave the coil 320 relatively unaffected. With reference now to FIG. 7 a layer of alumina is deposited, such a by sputtering, to form an alumina layer 702. Thereafter a chemical mechanical polishing (CMP) process can be performed (not shown). With reference back to FIG. 3, the CMP process is preferably performed sufficiently to generate flat upper surface 318 on the alumina layer 336, the flat upper surface 318 being coplanar with the upper surface 320 of the P1 pedestal 306, and preferably also coplanar with an upper surface of the back gap 310.

Subsequent manufacturing processes (not shown) include the deposition of the write gap layer 316, such as by sputter depositing alumina, formation of the second magnetic pole 308 such as by electroplating a magnetic material such as NiFe, and processes such as soda blast operations, photolithography and etching to clean and form the air bearing surface ABS of the slider.

The previously described RIE process 602 is preferably performed to remove an amount of photoresist material 402, 502 to allow the alumina layer 336 to be as thick as possible without forming voids, in order to provide the best possible protection against recession. As can be seen with reference to FIG. 3, the alumina layer 336 abuts the back end 337 of the P1 pedestal. Since alumina is several thousands of times stronger than photoresist, the presence of the alumina layer 336 will provide an effective brace against recession that would otherwise be caused by subsequent manufacturing processes such as soda blast operations used to clean dry film photoresist from the air bearing surface ABS.

It should also be pointed out that the structures formed after the formation of the alumina layer 336 could include additional structures, other than those shown with reference to FIG. 3. For example, the write head could include a second electrically conductive coil formed above the first coil 320 and separated from the first coil by a dielectric layer such as alumina. In addition, the second pole could be a bi-layer structure including a P2 pedestal and a P3 layer. Such a pole structure could be used in conjunction with the use of a second coil.

Figure 8:
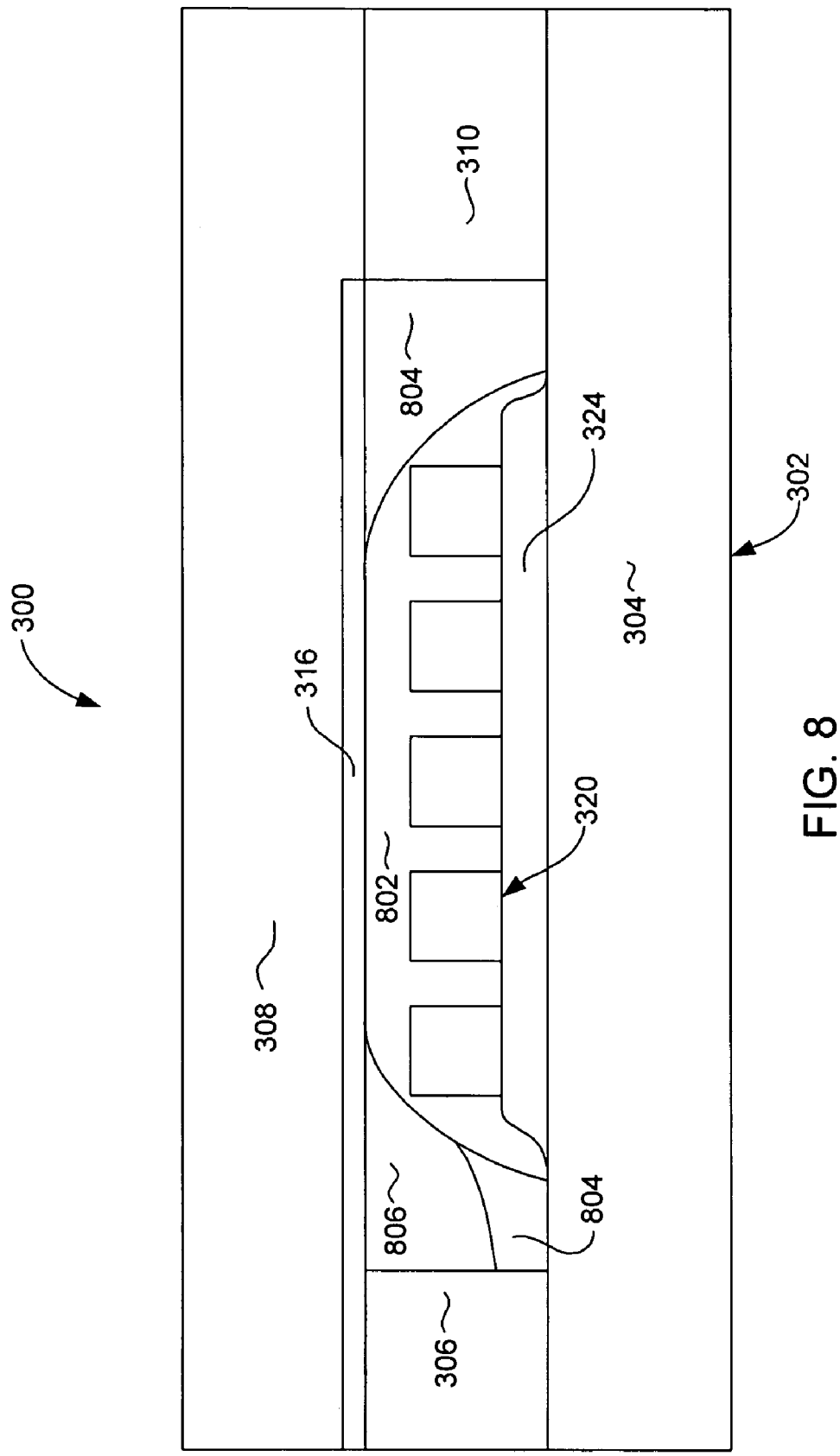
FIG. 8 is a cross-sectional view of a write head according to an alternate embodiment of the invention.

With reference now to FIG. 8, a write head 800 according to an alternate embodiment of the invention includes the first pole 302 including the first magnetic layer and P1 pedestal 306. The write head 800 further includes a second pole 308, back gap 310 and write gap layer 316. The write head 800 has a coil 320 embedded in a hard baked photoresist layer 802. A photoresist fill layer 804 is formed outside of the hard baked resist layer 802. The photoresist fill layer 804 only partially fills the space between the hard baked photoresist 802 and the P1 pedestal. However, on the opposite side of the coil 320, the photoresist fill layer 804 extends completely to the write gap 316, completely filling the space between the hard baked photoresist layer 802 and the back gap 310.

With continued reference to FIG. 8, the remaining space between the P1 pedestal 306 and the hard baked resist layer 802, and between the fill layer 804 and the write gap 316 is filled with a layer of alumina 806. The alumina layer 806 abuts the P1 pedestal 306 to provide a brace to prevent recession of the P1 pedestal 306. Although the alumina layer 806 of the presently described embodiment does not span as large an area as the alumina layer 336 of the previously described embodiment (FIG. 3) it does provide adequate bracing to prevent P1 Pedestal recession in most circumstances and may be preferred in light of various design considerations.

Figure 9:
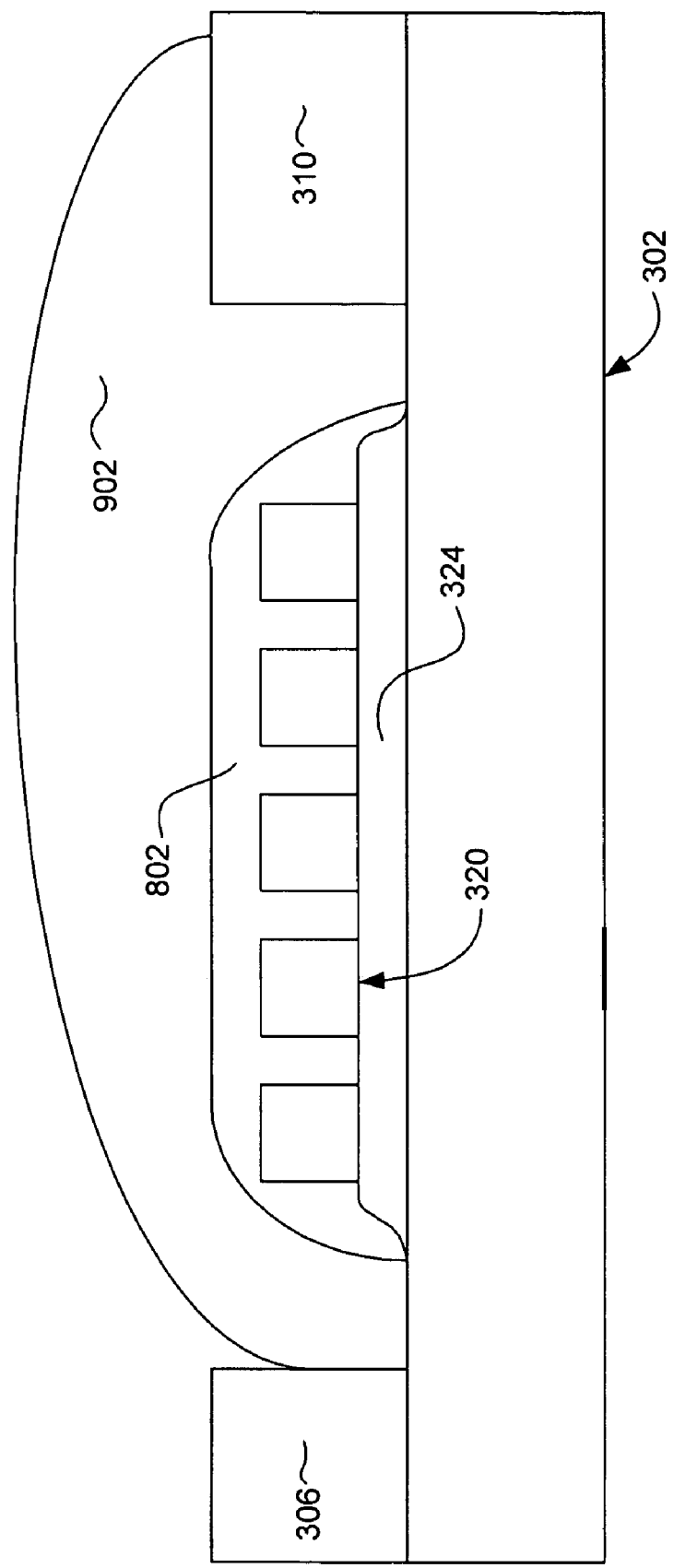
FIGS. 9-12 are cross-sectional views of the write head of FIG. 8 in various intermediate stages of manufacture.
Figure 10:
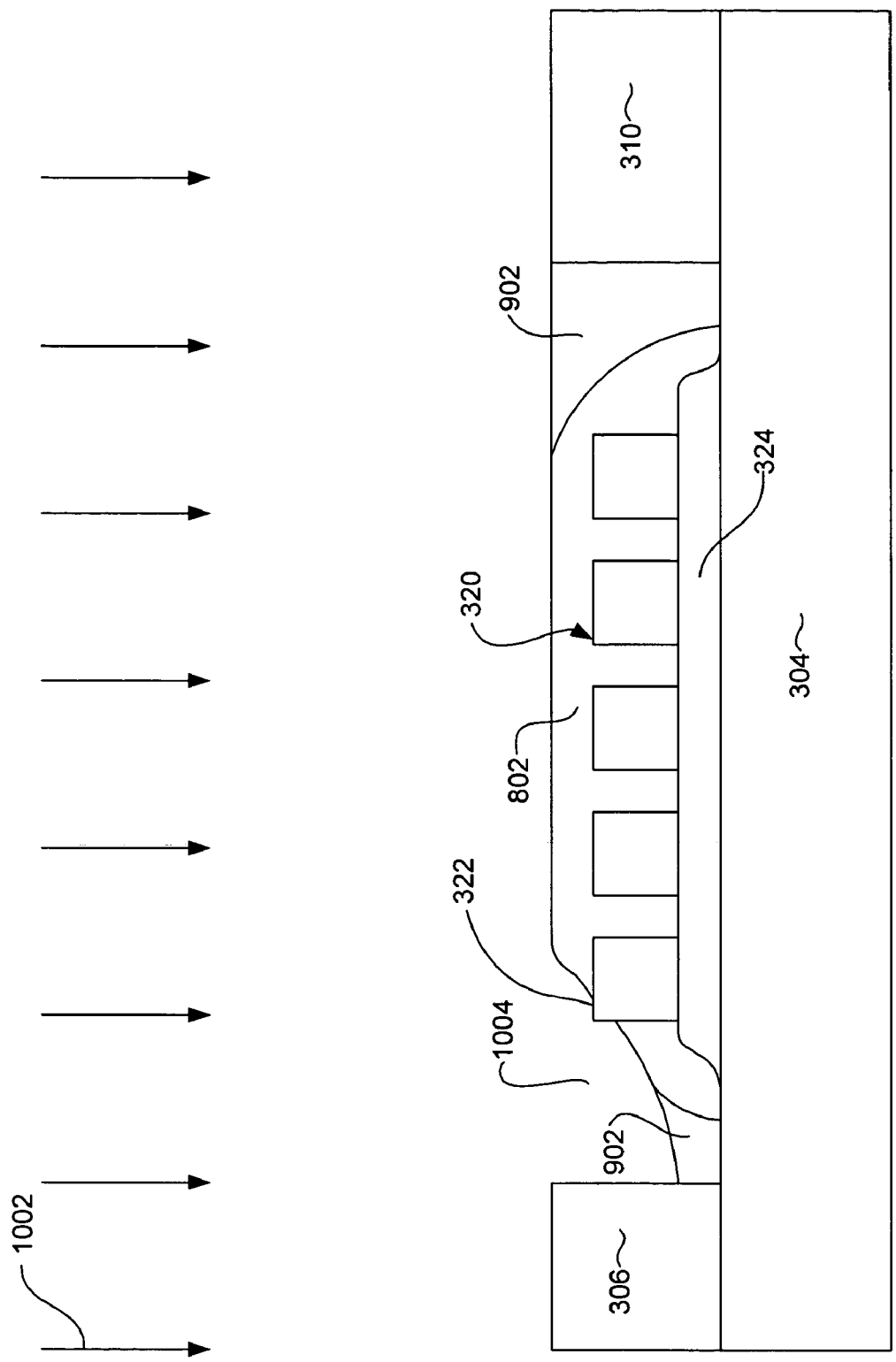
Figure 11:
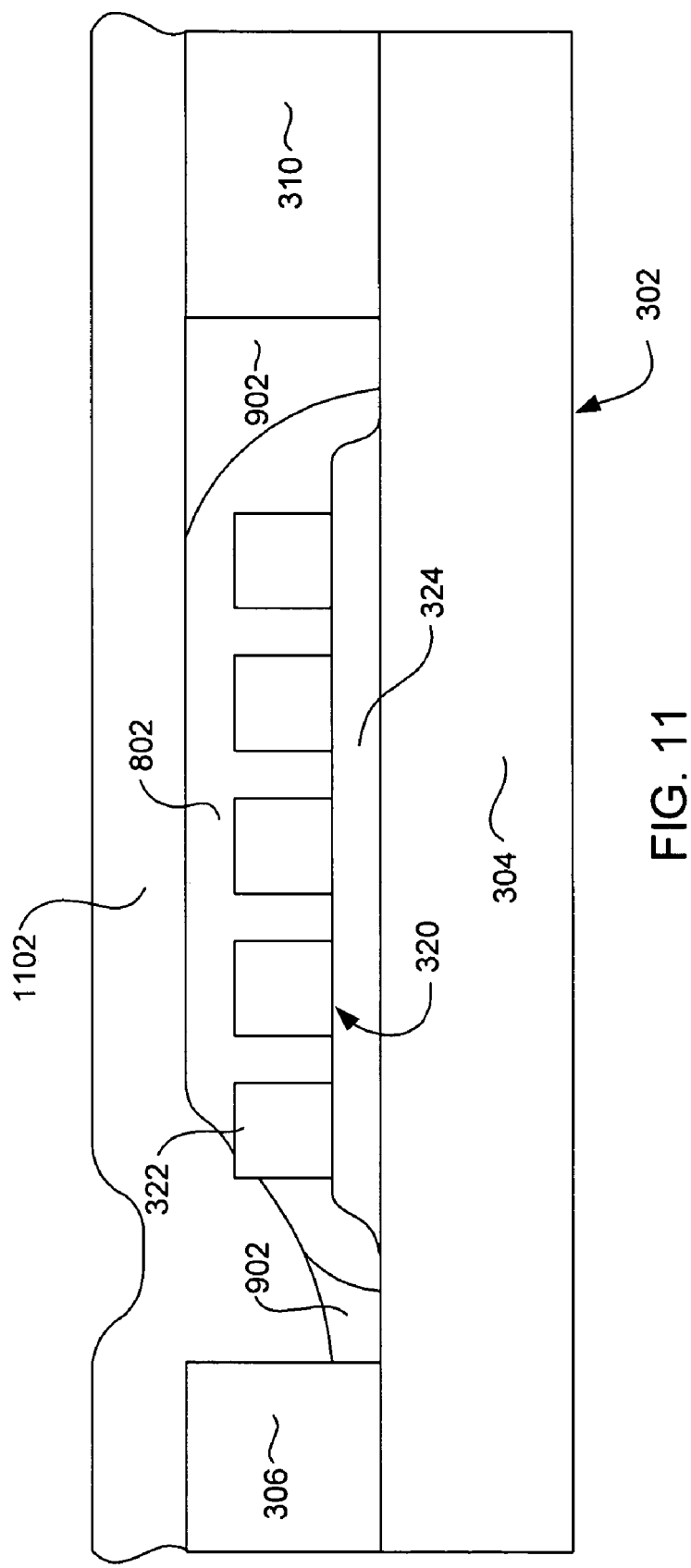

With reference FIGS. 9 through 11, a method of constructing a write head according to the embodiment of FIG. 8 is described. With particular reference to FIG. 9, the first pole 302, including the first layer 304 and pedestal 306 are formed as described earlier. The back gap 310, insulation layer 324, coil 320 and hard baked photoresist layer 402 are formed according to the methods described with reference to FIG. 4. Thereafter a layer of photoresist 902 is patterned and deposited. The photoresist layer 902 is formed in an offset or assymetrical manner as shown in FIG. 9 wherein the front end of the photoresist layer 902 terminates at or around the back end of the P1 pedestal 306, and the back end of the photoresist layer 902 extends to or near the back end of the back gap 310. The photoresist layer 902 could actually extend beyond the back gap 310.

Thereafter, with reference to FIG. 10, a RIE 1002 is performed to remove a desired amount of photoresist 902, 402 to form a cavity 1004 of a desired depth. As can be seen with reference to FIG. 10, the RIE process 1002 is preferably performed sufficiently to expose at least a portion of the first turn 322 of the coil 320. However, in this embodiment, the RIE does not expose all of the turns 322 of the coil 320 as was the case in the previously described embodiment. A CMP process may be performed if desired to form a planar upper surface 1006 on the top of the photoresist layers 902, 802. Alternatively, the RIE may be performed sufficiently to form a substantially planar surface on the photoresist layers 902, 802.

Figure 12:
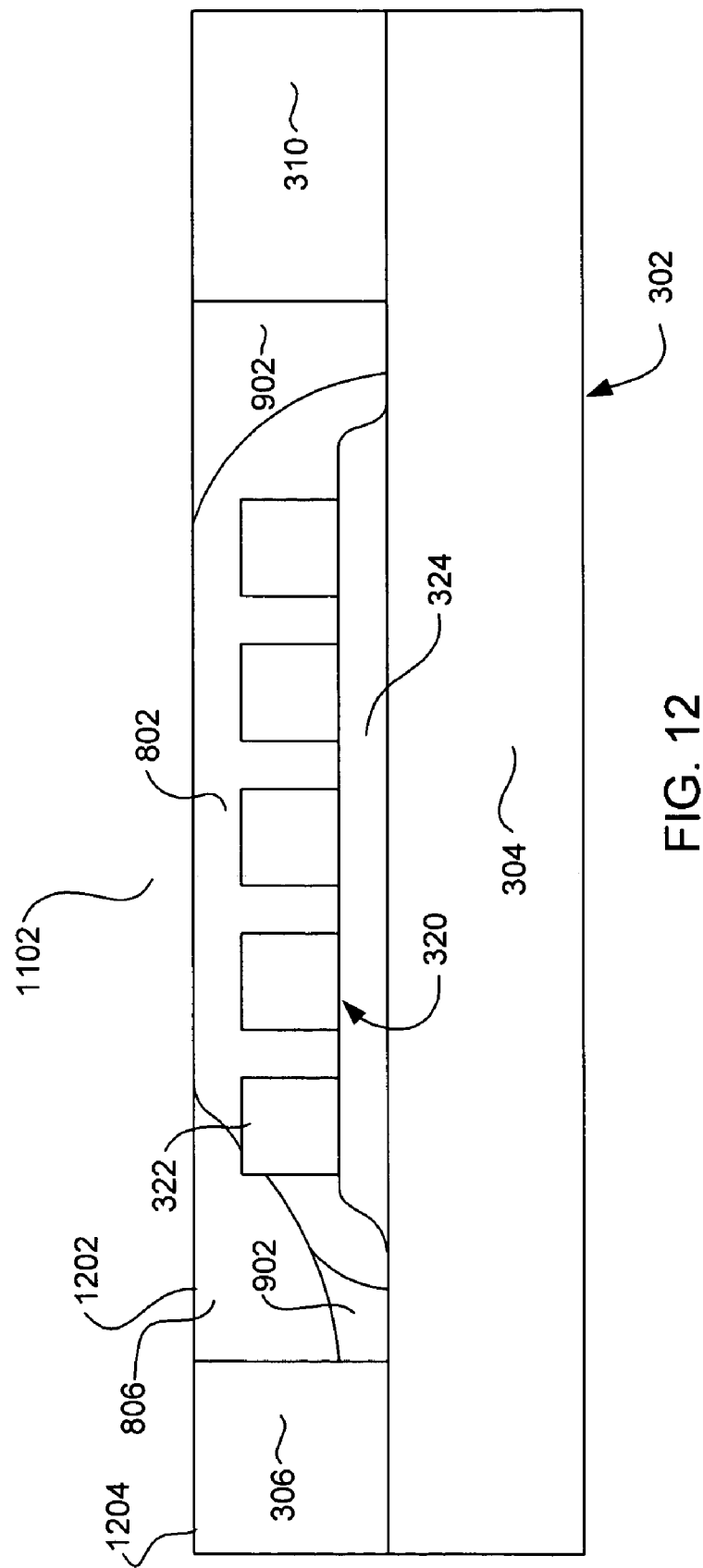

With reference now to FIG. 11 a layer of alumina 1102 is deposited, after which a chemical mechanical polishing process can be performed to remove excess alumina forming the alumina layer or alumina brace 806 (FIG. 12) having a flat upper surface 1202 that is coplanar with the upper surface 1204 of the P1 pedestal 306. Subsequently formed structures such as the write gap 316 and second pole 308 can be formed by the methods previously discussed.

While various embodiments have been described above, it should be understood that they have been presented by way of example only, and not limitation. Thus, the breadth and scope of the invention should not be limited by any of the above-described exemplary embodiments, but should be defined only in accordance with the following claims and their equivalents.

What is claimed is:

1. A magnetic write head, comprising:
   a first magnetic pole;
   a magnetic pedestal formed over and magnetically connected with the first pole in a pole tip region, the pedestal having an air bearing surface and a back end opposite the air bearing surface;
   a second magnetic pole formed above the first magnetic pole and magnetically connected with the first pole by a magnetic back gap structure disposed opposite the pole tip region;
   an electrically conductive coil having turns passing between the first and second poles between the pedestal and the back gap structure;
   a non-magnetic write gap disposed between the magnetic pedestal and the second pole;
   a layer of photoresist material formed over the first pole, a portion of the photoresist material being disposed between the turns of the coil, and a portion of the photoresist material being disposed between the coil and the pedestal; and
   a layer of $Al_2O_3$ (alumina) formed over the photoresist material, the layer of alumina abutting the back end of the pedestal and contacting at least one of the turns of the coil;
   wherein the layer of alumina is partially interspersed between the turns of the coil.

2. A write head as in claim 1 wherein:
   the coil has a first turn located closer to the pedestal than any other turn and a second turn located adjacent to the first turn;
   the layer of alumina extends from the pedestal to the first turn of the coil, contacting the first turn of the coil; and
   the layer of alumina terminates at a location between the pedestal and first turn of the coil.

3. A write head as in claim 1 wherein the layer of alumina extends from the back end of the pedestal, contacts a turn of the coil and terminates at a point prior to reaching the back gap.

4. A magnetic write head, comprising:
   a first magnetic pole;
   a magnetic pedestal formed over and magnetically connected with the first pole in a pole tip region, the pedestal having an air bearing surface and a back end opposite the air bearing surface;
   a second magnetic pole formed above the first magnetic pole and magnetically connected with the first pole by a magnetic back gap structure disposed opposite the pole tip region;

an electrically conductive coil having turns passing between the first and second poles between the pedestal and the back gap structure;

a non-magnetic write gap disposed between the magnetic pedestal and the second pole;

a layer of photoresist material formed over the first pole, a portion of the photoresist material being disposed between the turns of the coil, and a portion of the photoresist material being disposed between the coil and the pedestal; and a layer of $Al_2O_3$ (alumina) formed over the photoresist material, the layer of alumina abutting the back end of the pedestal and contacting at least one of the turns of the coil;

wherein the layer of photoresist material, comprises;

a coil insulation layer, comprising photoresist having portions disposed between the turns of the coil, and having a downward sloping portion disposed between the coil and the pedestal; and a fill layer comprising photoresist, disposed between the coil insulation layer and the pedestal portion.

5. A write head as in claim 4 wherein at least a portion of the layer of alumina is formed over the fill layer.

6. A magnetic write head, comprising:

a first magnetic pole;

a magnetic pedestal formed over and magnetically connected with the first pole in a pole tip region, the pedestal having an air bearing surface rid a back end opposite the air bearing surface;

a second magnetic pole formed above the first magnetic pole and magnetically connected with the first pole by magnetic back gap structure disposed opposite the pole tip region;

an electrically conductive coil having turns passing between the first and second poles between the pedestal and the back gap structure;

a non-magnetic write gap disposed between the magnetic pedestal and the second pole;

a layer of photoresist material formed over the first pole, a portion of the photoresist material being disposed between the turns of the coil, and a portion of the photoresist material being disposed between the coil and the pedestal; and a layer of $Al_2O_3$ (alumina) formed over the photoresist material, the layer of alumina abutting the back end of the pedestal and contacting at least one of the turns of the coil;

wherein the back end of the pedestal has a surface area, and wherein the layer of alumina abuts about half of the surface area of the back end of the pedestal.

7. A magnetic write head, comprising:

a first magnetic pole;

a magnetic pedestal formed over and magnetically connected with the first pole in a pole tip region, the pedestal having an air bearing surface and a back end opposite the air bearing surface;

a second magnetic pole formed above the first magnetic pole and magnetically connected with the first pole by a magnetic back gap structure disposed opposite the pole tip region;

an electrically conductive coil having turns passing between the first and second poles between the pedestal and the back gap structure;

a non-magnetic write gap disposed between the magnetic pedestal and the second pole;

a layer of photoresist material formed over the first pole, a portion of the photoresist material being disposed between the turns of the coil, and a potion of the photoresist material being disposed between the coil and the pedestal; and a layer of $Al_2O_3$ (alumina) formed over the photoresist material, the layer of alumina abutting the back end of the pedestal and contacting at least one of the turns of the coil;

wherein the layer wherein portions of the alumina layer extend into a space between the turns of the coil and wherein those portions of the alumina layer extend into the spaces between the coils by a vertical distance X that is no more than ½ a distance Y measured horizontally between the turns of the coil.

* * * * *

UNITED STATES PATENT AND TRADEMARK OFFICE
CERTIFICATE OF CORRECTION

| | | |
|---|---|---|
| PATENT NO. | : 7,292,408 B2 | Page 1 of 1 |
| APPLICATION NO. | : 10/903341 | |
| DATED | : November 6, 2007 | |
| INVENTOR(S) | : Andrew Chiu et al. | |

It is certified that error appears in the above-identified patent and that said Letters Patent is hereby corrected as shown below:

In claim 6, column 9, line 27, replace "surface rid" with --surface and--.

In claim 6, column 9, line 30, insert --a-- after "first pole by".

In claim 7, column 10, line 27, replace "potion" with --portion--.

Signed and Sealed this

Fifteenth Day of June, 2010

David J. Kappos
*Director of the United States Patent and Trademark Office*